US010769234B2

(12) United States Patent
Swedlund et al.

(10) Patent No.: US 10,769,234 B2
(45) Date of Patent: Sep. 8, 2020

(54) DOCUMENT OBJECT MODEL TRANSACTION CRAWLER

(71) Applicant: EntIT Software LLC, Sunnyvale, CA (US)

(72) Inventors: Thomas Christopher Swedlund, Alpharetta, GA (US); Kevin Allen Williams, Alpharetta, GA (US); Brian Charles King, Alpharetta, GA (US)

(73) Assignee: MICRO FOCUS LLC, Santa Clara, CA (US)

( * ) Notice: Subject to any disclaimer, the term of this patent is extended or adjusted under 35 U.S.C. 154(b) by 466 days.

(21) Appl. No.: 15/680,418

(22) Filed: Aug. 18, 2017

(65) Prior Publication Data
US 2018/0060446 A1 Mar. 1, 2018

Related U.S. Application Data

(60) Provisional application No. 62/382,149, filed on Aug. 31, 2016.

(51) Int. Cl.
*G06F 17/30* (2006.01)
*G06F 16/958* (2019.01)
*G06F 16/951* (2019.01)
*G06F 16/955* (2019.01)
*G06F 16/23* (2019.01)
*G06F 16/957* (2019.01)

(52) U.S. Cl.
CPC ........ *G06F 16/986* (2019.01); *G06F 16/2358* (2019.01); *G06F 16/951* (2019.01); *G06F 16/955* (2019.01); *G06F 16/9577* (2019.01)

(58) Field of Classification Search
CPC .. G06F 16/986; G06F 16/955; G06F 16/9577; G06F 16/2358; G06F 16/951
See application file for complete search history.

(56) References Cited

U.S. PATENT DOCUMENTS

| 9,208,235 | B1 | 12/2015 | Liu | |
|---|---|---|---|---|
| 10,372,785 | B2* | 8/2019 | Margatan | ................ H04L 67/02 |
| 10,430,212 | B1* | 10/2019 | Bekmambetov | ........ G06F 16/71 |
| 2007/0006078 | A1* | 1/2007 | Jewsbury | ................ G06F 40/14 |
| | | | | 715/716 |
| 2013/0290786 | A1* | 10/2013 | Artzi | ................... G06F 11/3676 |
| | | | | 714/32 |

(Continued)

FOREIGN PATENT DOCUMENTS

WO WO-2014190427 A1 12/2014

OTHER PUBLICATIONS

Acunetix Inc., Deep Crawling of Html5 & Javascript Websites with Acunetix Deepscan Technology, [downloaded from the Internet May 17, 2015], 5 pages.

(Continued)

*Primary Examiner* — Huawen A Peng

(57) ABSTRACT

Examples herein involve a document object model (DOM) transaction crawler. Examples herein involve identifying an event in a first state of a document object model. The event is executed to cause a state change from the first state of the document object model to a second state of the document object model. Furthermore, the state change is stored in a transaction log to store the difference between the first state of the document object model and the second state of the document object model.

20 Claims, 7 Drawing Sheets

(56) References Cited

U.S. PATENT DOCUMENTS

2014/0075563 A1    3/2014  Simpson et al.
2016/0110455 A1*   4/2016  von Bochmann .. G06F 16/9577
                                                          707/709

OTHER PUBLICATIONS

Bezemer, C-P., et al., Automated Security Testing of Web Widget Interactions, Delft University of Technology, Report TUD-SERG-2009-011, Aug. 23-28, 2009, 14 pages.
Deursen, A.V., et al., Crawl-based Analysis of Web Applications: Prospects and Challenges, Delft University of Technology, 2014, 14 pages.
Pellegrino, G., et al., JÂk: Using Dynamic Analysis to Crawl and Test Modern Web Applications, Saarland University, Sep. 8, 2015, 22 pages.
European Patent Office, EP Search Report for Appl. No. 17188285.5-1222 dated Jan. 24, 2018 (10 pages).
Mesbah et al; Crawling Ajax-Based Web Application through Dynamic Analysis of User Interface State Changes; ACM Transactions on the Web, vol. 6, No. 1, Article 3, Publication date: Mar. 2012 (30 pages).
Zhang et al; AJAX Crawling Scheme Based on Document Object Model; 2012 Fourth International Conference on Computational and Information Sciences; Dept. of Information Engineering; Xuzhou College of Industrial Technology; 2012 IEEE (4 pages).

* cited by examiner

DOCUMENT OBJECT MODEL TRANSACTION CRAWLER

CROSS REFERENCE TO RELATED APPLICATION

This application claims the benefit under 35 U.S.C. § 119(e) of U.S. Provisional Application Ser. No. 62/382,149, filed Aug. 31, 2016, which is hereby incorporated by reference.

BACKGROUND

Web crawlers identify content of a web to enable entities to automatically determine content of web pages without the need for user interaction with the web page. Web crawlers may identify content of web pages using hypertext markup language (HTML) of the web pages, document object models (DOMs) of the web pages, etc. Some web pages may include web applications that enable user interaction with the web page and/or features of the web page via the web application.

BRIEF DESCRIPTION OF THE DRAWINGS

Wherever possible, the same reference numbers will be used throughout the drawing(s) and accompanying written description to refer to the same or like parts.

DETAILED DESCRIPTION

Figure 1:
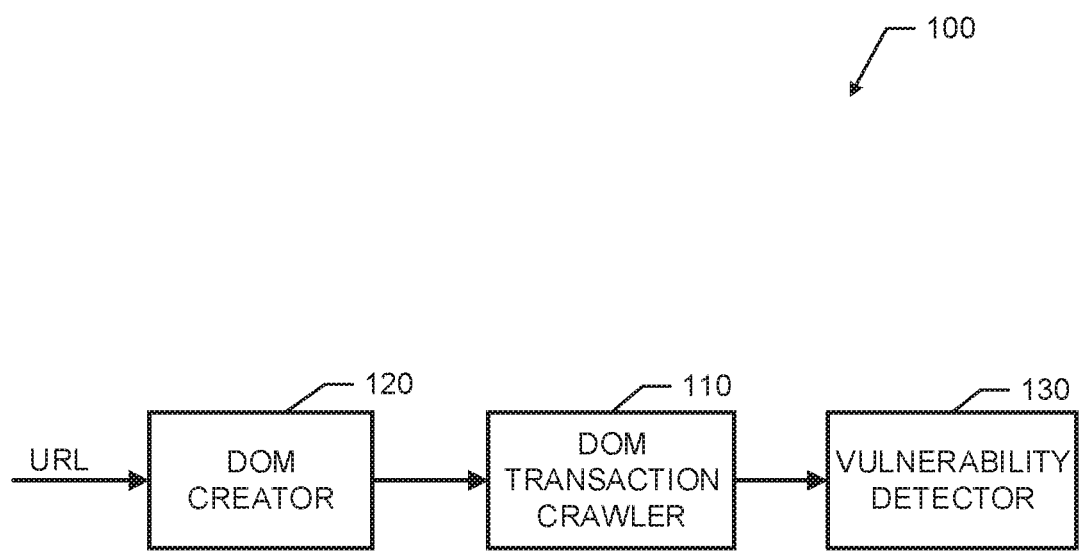
FIG. 1 illustrates a schematic diagram of an example document object model (DOM) crawler system including a DOM transaction crawler that may be implemented in accordance with an aspect of this disclosure.

Examples disclosed herein involve a document object model (DOM) transaction crawler to navigate a DOM of a webpage or web application (e.g., a single page application or other dynamic application).

Web crawlers, in general, are to automatically (without any user interaction, other than to perhaps initiate a crawl) discover content of a web application. However, without proper understanding of content of an application, it may not be possible to identify all events (or all attack points for a security scanner) of a web application. Content of large dynamic sites (e.g., single page applications (SPAs)) may be represented via a DOM and transitions between states of the DOM driven by code (e.g., JavaScript). In order for a crawler to discover DOM transitions, the crawler gains knowledge of the DOM to use heuristics to navigate DOM transitions as a user might navigate the web application. However, a web application's event space can become large enough to make a crawl intractable. To accurately navigate a DOM, events are run and resources are to be requested in a precise order from when the web crawler first interacts with the web application. A consequence of this is that an entire web application may need to be repeatedly loaded and executed to reach each transition of the DOM. In examples herein, a web transaction crawler records atomic state changes when executing an event of a DOM such that the state changes can be reverted to a previous state prior to executing the event. Accordingly, examples herein, provide an effective and efficient means of traversing a DOM of a web application without re-executing the web application to reach each transition or event of the DOM.

In examples herein, events are traversed by executing the events, identifying state changes in response to execution of the events, and recording (or storing) the state changes in a transaction log. Accordingly, transactions may be returned to a previous state prior to execution of any event of the application based on the recorded state changes so that any remaining events in the DOM can be identified and executed as if the event was not executed. As such, state changes from execution of events are reverted (e.g., rolled back) and the state changes may be played back (by retrieving and implementing state changes in the DOM) to crawl a DOM without re-execution of the events.

Examples herein involve identifying an event in a first state of a document object model. The event is executed to cause a state change from the first state of the document object model to a second state of the document object model. Furthermore, the state change may be stored in a transaction log to store the difference between the first state of the document object model and the second state of the document object model. Examples further involve reverting the document object model from the second state of the document object model to the first state of the document object model for execution of a subsequent event of the first state of the document object model.

As used herein, content of a web page or web application may refer to any text, graphic, picture, user interface, clickable (e.g., a button, drop down, etc.), mouse-over, etc. that is provided and/or available via the web page or web application. Furthermore, a web page or web application may be used interchangeably, however, a web application (or SPA) may be included within a web page.

FIG. 1 is a schematic diagram of an example document object model (DOM) crawler system 100 including a DOM transaction crawler 110 implemented in according with examples herein. The example DOM crawler system 100 of FIG. 1 includes the DOM transaction crawler 110, a DOM creator 120, and a vulnerability detector 130. In examples herein, the DOM creator 120 creates a DOM from hypertext markup language (HTML) of a universal resource locator (URL), the DOM transaction crawler 110 determines content of a web page or a web application of the URL using the generated DOM, and the vulnerability detector 130 detects vulnerabilities in the content of the web page or web application of the URL.

The example DOM creator 120 generates a DOM of a web page using HTML of a received or retrieved URL. For example, the DOM creator 120 may be implemented by a headless browser to build a DOM from the HTML for the web page or web application. For example, the DOM creator 120 may parse the HTML of a URL and run any code (e.g., JavaScript) necessary for the SPA to load. The example DOM creator 120 may modify any data objects involved with the DOM and the code runtime by tagging properties of the object to represent the object. Such properties may be adjusted each time the properties change as a result of triggering an event in the DOM. Accordingly, the generated DOM may be used to independently detect, execute, and analyze content of the web application without affecting the actual web application.

The DOM transaction crawler 110 of FIG. 1 crawls the DOM generated by the DOM creator 120 accordingly to examples herein. The DOM transaction crawler 110 discovers events within the generated DOM. For example, the DOM transaction crawler 110 may identify events of interest, such as user interactive events. In examples herein, the events of a generated DOM may form a tree architecture, such that certain events are triggered in response to triggering other events. The example DOM transaction crawler 110 may then execute the events of the DOM (independently from executing any events of the actual web page or web application) to determine the content of the web page or web application. Further, in examples herein, the DOM transaction crawler 110 utilizes a transaction mechanism to record changes (e.g., in a transaction log) in the state of the DOM in response to triggering an event, and reverting the DOM to a previous state after triggering each event. The example recorded changes may be used to efficiently and effectively navigate the transitions of the DOM.

Once the DOM transaction crawler 110 navigates the DOM to determine the content of the webpage or web application, the vulnerability detector 130 may then detect vulnerabilities in the content of the web application by attacking or accessing portions of the web content with a securities scanner. Any suitable technique may be used to perform a security scan and detect vulnerabilities in the web content. In some examples, additional components or alternative components to the vulnerability detector 130 may be included in the example system 100 of FIG. 1 to perform additional/alternative analysis on the web content identified by the DOM transaction crawler 110. Accordingly, examples herein may allow for detection of vulnerabilities of a web page or web application or any other type of analysis by efficiently crawling a DOM generated from HTML of the web page or web application.

Figure 2:
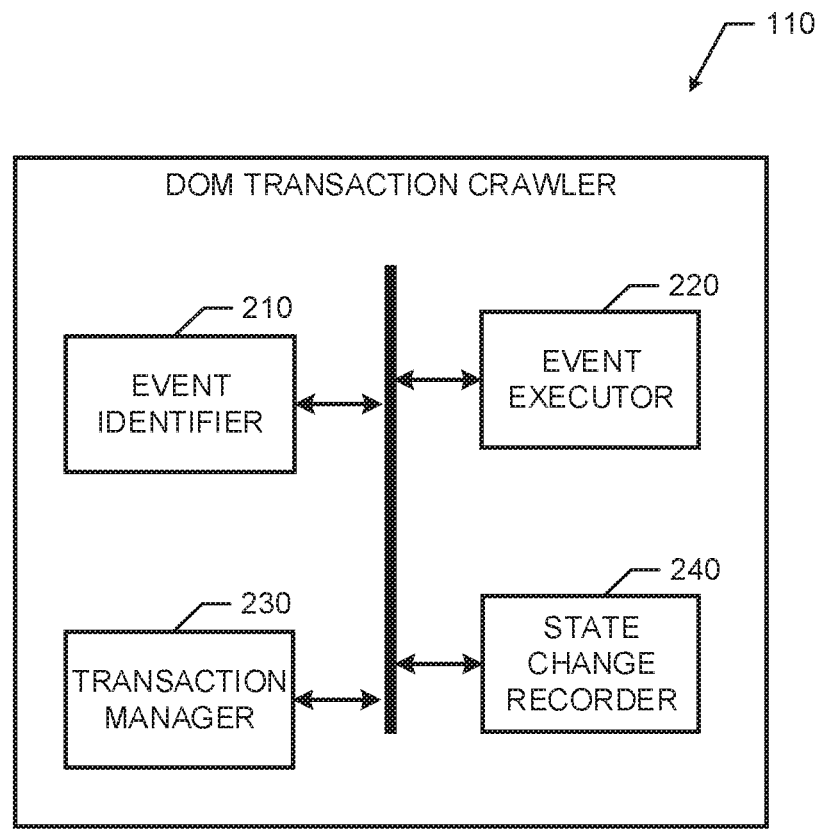
FIG. 2 a block diagram of an example DOM transaction crawler that may be used to implement the DOM transaction crawler of FIG. 1.

FIG. 2 is a block diagram of an example DOM transaction crawler 110 that may be used to implement the DOM transaction crawler 110 of FIG. 1. The example DOM transaction crawler 110 of FIG. 2 includes an event identifier 210, an event executor 220, a transaction manager 230, and a state change recorder 240. In examples herein, the event identifier 210 identifies events in a DOM of a web application, the event executor 220 executes the identified events, the transaction manager 230 maintains a state of the DOM after executing the events, and the state change recorder 240 logs changes in the state of the DOM based on the execution of the events.

The example event identifier 210 may scan or search a DOM (e.g., a DOM generated by the DOM creator 120 of FIG. 1) for events of interest. Example events of interest may include user interactive events, such as button clicks, mouse-overs, or form submissions. The event identifier 110 may identify static events by traversing nodes of the DOM and scanning for event attributes (e.g., from tagged properties of the event). For example, a <button> element of the DOM may include code (e.g., JavaScript) within an attribute (e.g., an 'onclick' attribute). In some examples, events may be applied to elements dynamically using a call (e.g., to 'addEventListener'), which may be tracked so that the events may be stored and executed. In some examples, anchor tags may include code in a definition (e.g., a 'href' definition) by prepending 'javascript:' to the code. As such, the event identifier 210 may identify events in a DOM, such as a DOM generated by the DOM creator 120 of FIG. 1.

The example event executor 220 executes the events to elicit DOM state transitions, which may make additional events available and/or identifiable. In examples herein, after an event is executed in the DOM, a new state of the DOM is generated. The example new state of the DOM may reflect the state of the DOM as a result of executing the event. In such examples, after execution of an event, the event identifier 210 may then scan the new state of the DOM to identify any new or other events in the new state of the DOM. These new events may be subsequent events to be executed in a subsequent iteration. Accordingly, this iterative process may build a tree of DOM events that may be traversed to discover content of a web application.

In examples herein, the event executor 220 and event identifier 210 may use heuristics such as a breadth-first crawl or a depth-first crawl of an event tree of the DOM. For example, a breadth-first crawl involves executing each sibling event of a tier of an event tree of a DOM before advancing to a next tier of the event tree of the DOM and a depth-first crawl involves executing the sibling events of a branch of an event tree of the DOM before advancing to a next branch of the event tree of the DOM (see FIG. 3 and accompanying description below). Additionally or alternatively, other heuristics may be used or implemented to reflect behavior of a user (e.g., using information corresponding to frequented traffic patterns of the web application). For example, user interactions with elements within a form may be clustered prior to triggering a form submission event. Accordingly, the event executor 220 may effectively pair an event-based crawl with a traffic-based crawl to traverse the events of a DOM and enable access to the content of the web application.

The example transaction manager 230 of FIG. 2 identifies state changes between states (e.g., tiers or branches of an event tree) of a DOM in response to the execution of each of the events by the event executor 220 and reverts/returns the generated DOM to a previous state prior to the event executor 220 executing each event without re-executing the entire web application. Accordingly, the transaction manager 230 enables the DOM transaction crawler 110 to crawl events of the DOM without keeping the effects of previous event traversal by playing back state changes (retrieving stored state changes). For example, when traversing the event in a depth-first manner, sibling events (events from the same state of the DOM) may be run without affecting the triggering of another event. The example transaction manager 230 may achieve this by, after the event executor 220 executes the event, the transaction manager 230 determines the state changes to the DOM (which are recorded by the state change recorder 240) and returns the DOM back to the state of the DOM prior to executing that event, then running the sibling event. The transaction manager 230 may return the DOM to the previous state by simply rolling back the state changes.

In examples herein, to revert the state changes, the transaction manager 230 may refer to a log of the state changes maintained by the state change recorder 240. The state change recorder 240 records atomic state changes to the DOM after the event executor 220 executes each event of the DOM in a transaction log. Accordingly, the state change recorder 240 may include or have access to a database for maintaining the transaction log. In examples herein, the transaction manager 230 may then refer to the state changes in the transaction log to revert or roll back the state of the DOM after execution of each event so that sibling events may be executed without affecting one another. In other words, the state changes from executing one sibling event will not carry over to the execution of another sibling event. As such, the event executor 220 (and the DOM transaction crawler 110, generally) are able to traverse and execute sibling events as if none of the sibling events had yet been executed, though some of them may actually have been executed. Furthermore, the transaction manager 230 may use the transaction log to play back state changes to a subsequent state of the DOM after execution of all sibling events of a state of the DOM. For example, the transaction manager may retrieve state changes corresponding to events in the transaction log of the state change recorder and implement those changes in the DOM to reach the desired event of the DOM. The transaction manager 230 may traverse a DOM using state changes in the transaction log to reach a particular state of the DOM. Accordingly, subsequent events in subsequent states of the DOM may be reached without re-executing the entire web application or events of the web application (e.g., from the beginning or an initial state of the DOM).

By recording only the state changes to the DOM in the transaction log, the transaction manager 230 enables the DOM transaction crawler 110 to effectively and efficiently traverse the events of a DOM. Recording the state changes to the DOM after each execution of an event and rolling back the state changes allows for the isolation of event executions, which facilitates traversing the events of the DOM without accumulating state transitions. Furthermore, the transaction manager 230 and the state change recorder 240 assist in crawl tractability by allowing DOM transitions to occur without having to re-traverse the web application. Furthermore, the transaction manager 230 and state change recorder 240 may advance tractability by persisting transactions to persistent storage and relieving memory pressure on the DOM transaction crawler 110.

While an example manner of implementing the DOM transaction crawler 110 of FIG. 1 is illustrated in FIG. 2, at least one of the elements, processes and/or devices illustrated in FIG. 2 may be combined, divided, re-arranged, omitted, eliminated and/or implemented in any other way. Further, the event identifier 210, the event executor 220, the transaction manager 230, the state change recorder 240, and/or, more generally, the DOM transaction crawler 110 of FIG. 2 may be implemented by hardware and/or any combination of hardware and executable instructions (e.g., software and/or firmware). Thus, for example, any of the event identifier 210, the event executor 220, the transaction manager 230, the state change recorder 240, and/or, more generally, the DOM transaction crawler 110 of FIG. 2 could be implemented by at least one of an analog or digital circuit, a logic circuit, a programmable processor, an application specific integrated circuit (ASIC), a programmable logic device (PLD) and/or a field programmable logic device (FPLD). When reading any of the apparatus or system claims of this patent to cover a purely software and/or firmware implementation, at least one of the event identifier 210, the event executor 220, the transaction manager 230, and/or the state change recorder 240 is/are hereby expressly defined to include a tangible machine readable storage device or storage disk such as a memory, a digital versatile disk (DVD), a compact disk (CD), a Blu-ray disk, etc. storing the executable instructions. Further still, the example DOM transaction manager 110 of FIG. 2 may include at least one element, process, and/or device in addition to, or instead of, those illustrated in FIG. 2, and/or may include more than one of any or all of the illustrated elements, processes and devices.

Figure 3:
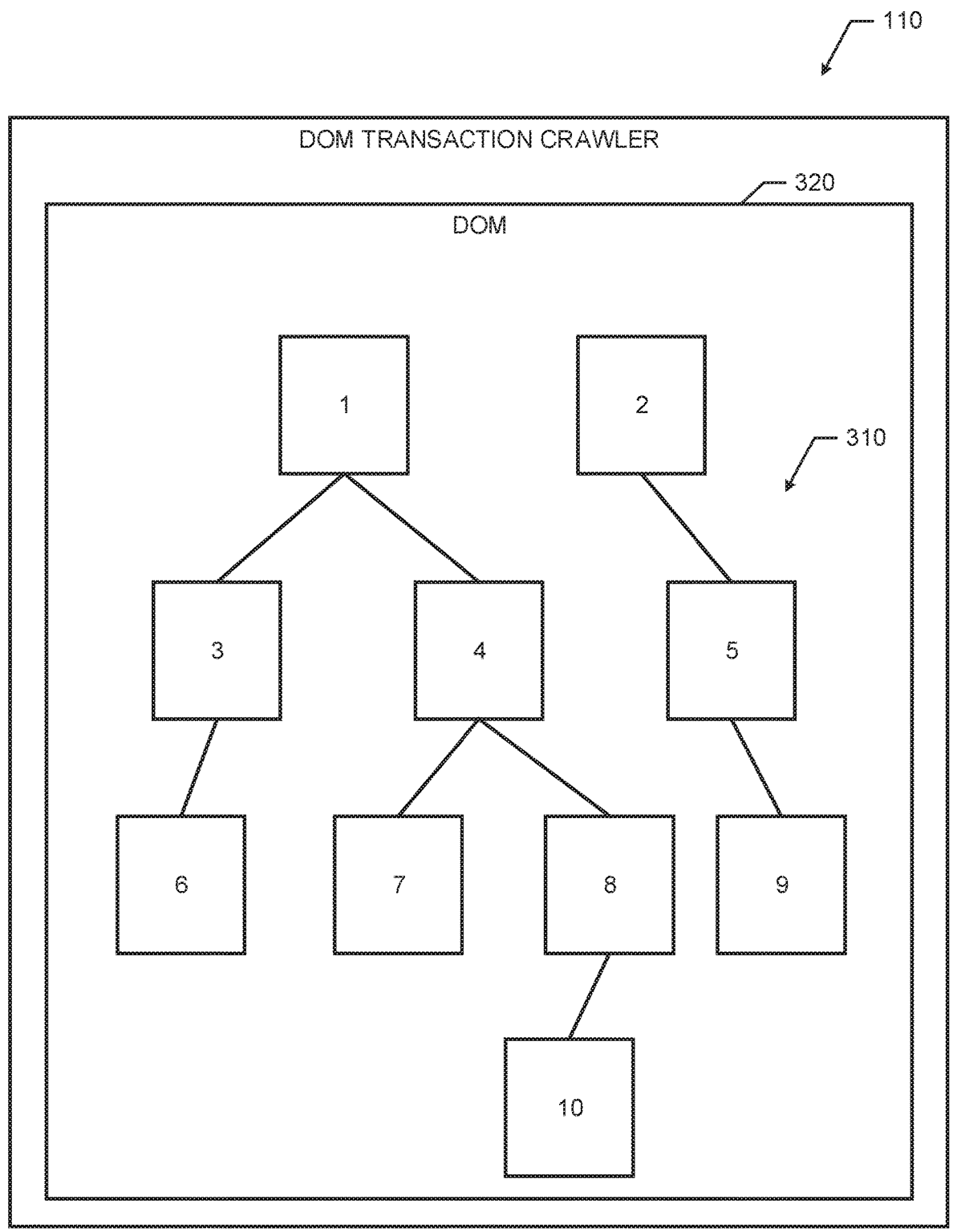
FIG. 3 illustrates an example event tree of a DOM that may be traversed by the DOM transaction crawler of FIG. 2 in accordance with examples herein.

FIG. 3 illustrates an example event tree 310 of a DOM 320 that may be traversed by a DOM transaction crawler 110, which may be implemented by the DOM transaction manager 110 of FIG. 2. The example event tree 310 includes ten (numbered 1-10) events that may be executed by the event executor 220 to access content of a web application of the DOM 320.

As mentioned above, the DOM transaction crawler 110 may traverse the events of the DOM 320 via a breadth-first crawl or a depth-first crawl. Referring to FIG. 3, an example breadth-first crawl of the event tree 310 involves the event executor 220 executing the events across tiers of the event tree. For example, to perform a breadth-first crawl of the event tree 310, the event executor 220 executes event 1, the state change recorder 240 records any change in the state of the DOM after the execution of event 1 to a transaction log, and the transaction manager 230 reverts the state of the DOM 320 to the state of the DOM prior to execution of event 1 (as if event 1 had not been executed). Then, after the execution, state change recording, and reversion back to the original state of the DOM relative to executing event 1 (hereinafter referred to as an iteration of an event), the event identifier 210 and/or event executor 220 may determine whether there are any remaining sibling events of events 1 (breadth-first sibling events) to be executed. Identifying event 2 as breadth-first crawl sibling event, the event executor 220 may then execute event 2, record any state changes, and revert back to the original state of the DOM 320 prior to executing event 2. With all sibling events of that tier of the event tree having been executed, the event executor 220 may move on to execute the next event.

To move onto a next event, the event executor 220 may refer to the transaction log to determine state changes of executing event 1, which may indicate that events 3 and 4 are created in response to executing event 1. The event executor 220 may then execute event 3, the state change recorder 240 may store any changes in the state of the DOM 320 in the transaction log, and the transaction manager 230 revert back the DOM 320 back the state of the DOM prior to executing event 3. From there, the event executor 220, state change recorder 240, and transaction manager 230 may perform the same iteration for event 4 (identifying event 4 as a sibling of event 3). Following the execution of event 4, as there are no remaining siblings of event 3 and 4, the event executor 220 may play back the state changes from events 1 and 3 and perform the same iterations for event 6, before playing back states changes of 1 and 4 to perform iterations on event 7, then event 8, then event 10, before returning to the branch of event 2 to play back the state changes of event 2 and perform iterations on events 5 and 9. In these examples, when moving from one branch to another, the DOM transaction crawler 110 (e.g., via the transaction manager) may move to each branch by referring to the transaction log of the state change recorder 240, and retrieving the state change to effectively set the state of the DOM 320 to the appropriate state (e.g., the state after executing event 2 to subsequently execute event 5).

Additionally or alternatively, the DOM transaction crawler 110 may traverse the event tree 310 of the DOM 320 via a depth-first crawl in accordance with examples herein. For a depth-first crawl, the example event executor 220 may perform iterations on event 1, then event 3, then event 6, before reverting back to the state of the DOM 320 and playing back the state changes from executing event 1, to perform iterations on event 4, event 7, event 8, and event 10. After completing the branch of the event tree 310 extending from event 1, the DOM transaction crawler in a depth-first crawl may then play back the DOM back to the original state of the DOM 320 (by referring to the transaction log of the state change recorder 240) to perform the iterations on the branch of the event tree extending from event 2 (i.e., event 2, event 5, and event 9).

Accordingly, the order of iterations for a breadth-first crawl of the example event tree 310 may be 1, 2, 3, 4, 6, 7, 8, 10, 5, 9, while the order of iterations for a depth-first crawl of the example event tree 310 may be 1, 3, 6, 4, 7, 8, 10, 2, 5, 9. User settings or preferences may be used to select a traversal method. Accordingly, regardless of the selected method, the DOM transaction crawler 110 may effectively and efficiently traverse the event tree by storing state changes, retrieving state changes, and loading the state changes after all sibling events for a state of a DOM have been executed.

Figure 4:
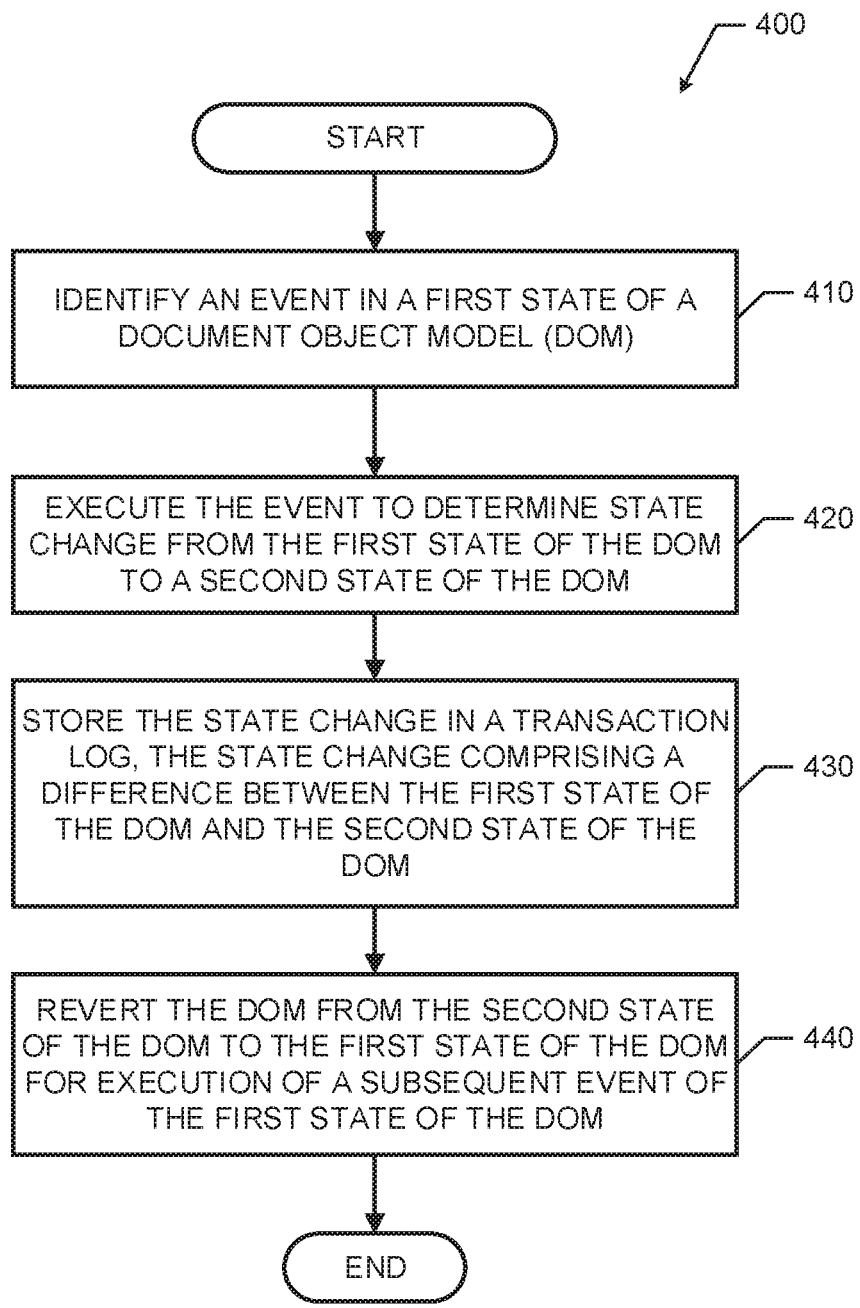
FIG. 4 is a flowchart representative of example machine readable instructions that may be executed to implement the DOM transaction crawler of FIG. 2.
Figure 5:
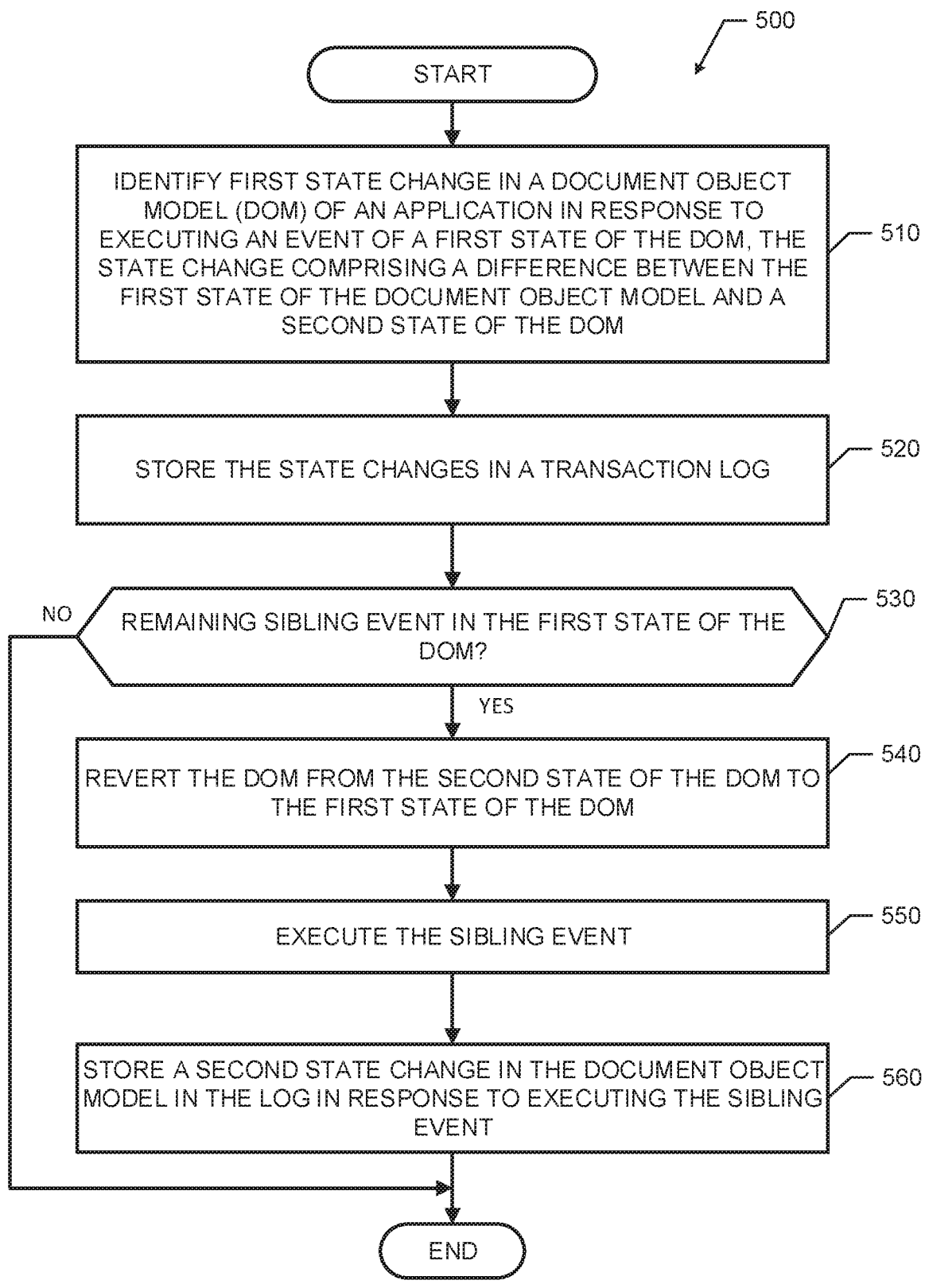
FIG. 5 is a flowchart representative of example machine readable instructions that may be executed to implement the DOM transaction crawler of FIG. 2 to enable isolated execution of events by managing transactions and storing state changes between states of a DOM in accordance with an aspect of this disclosure.
Figure 6:
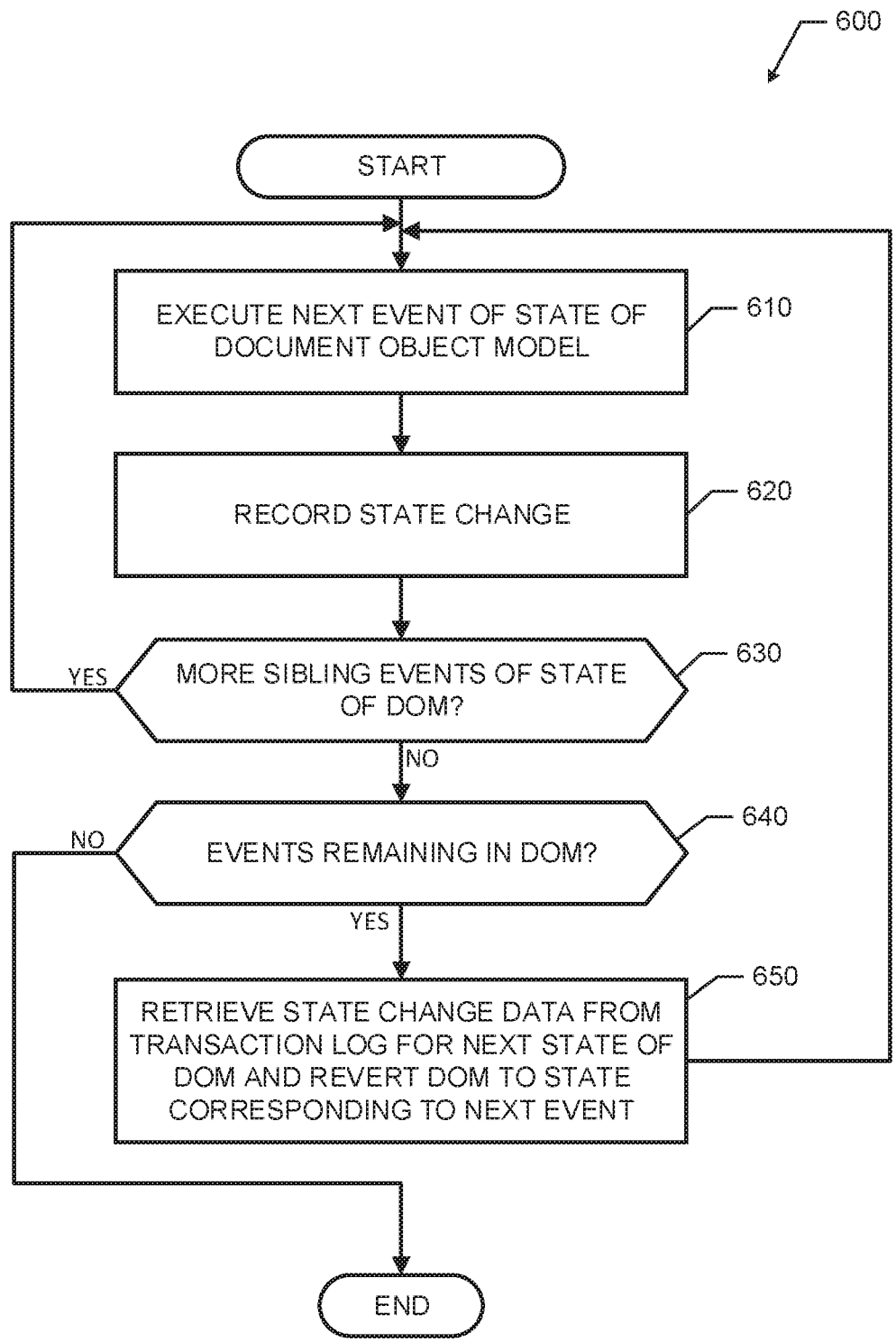
FIG. 6 is a flowchart representative of example machine readable instructions that may be executed to implement the DOM transaction crawler of FIG. 2 to execute an iteration of traversing an event in accordance with an aspect of this disclosure.

Flowcharts representative of example machine readable instructions for implementing the DOM transaction crawler 110 of FIG. 2 are shown in FIGS. 4, 5, and 6. In this example, the machine readable instructions comprise a program(s)/process(es) for execution by a processor such as the processor 712 shown in the example processor platform 700 discussed below in connection with FIG. 7. The program(s)/process(es) may be embodied in executable instructions (e.g., software) stored on a tangible machine readable storage medium such as a CD-ROM, a floppy disk, a hard drive, a digital versatile disk (DVD), a Blu-ray disk, or a memory associated with the processor 712, but the entire program/process and/or parts thereof could alternatively be executed by a device other than the processor 712 and/or embodied in firmware or dedicated hardware. Further, although the example program(s)/process(es) is/are described with reference to the flowchart illustrated in FIGS. 4, 5, and/or 6, many other methods of implementing the example DOM transaction crawler 110 may alternatively be used. For example, the order of execution of the blocks may be changed, and/or some of the blocks described may be changed, eliminated, or combined.

The example process 400 of FIG. 4 begins with an initiation of the DOM transaction crawler 110 (e.g., upon startup, upon instructions from a user, upon startup of a device implementing the DOM transaction crawler 110 (e.g., the DOM crawler system 100), etc.). The example process 400 of FIG. 4 may be executed to traverse an event of a DOM in accordance with examples herein. At block 410, the event identifier 210 identifies an event in a first state of a DOM. For example, at block 410, the event identifier 210 may identify user interactive events (e.g., using attributes for the events stored in the DOM). At block 420, the event executor 220 executes the event to determine state change from the first state of the DOM to a second state of the DOM.

At block 430 of FIG. 4, the state change recorder 240 stores the state change comprising a difference between the first state of the DOM and the second state of the DOM in a transaction log. At block 440, the transaction manager 230 reverts the DOM from the second state of the DOM to the first state of the DOM for execution of a subsequent event of the first state of the DOM. After block 440, the example process 400 ends.

The example process 500 of FIG. 5 begins with an initiation of the DOM transaction crawler 110. The example process 500 of FIG. 5 may be executed to enable isolated execution of events by managing transactions and storing state changes between states of a DOM. At block 510, the transaction manager 230 identifies a first state change in a DOM of an application in response to executing an event of a first state of the DOM. The state change of the DOM in block 510 is a difference between a first state of the DOM and a second state of the DOM. At block 520, the state change recorder 240 stores the state changes in a transaction log.

At block 530 of FIG. 5, the event identifier 210 and/or event executor 220 determines whether there are any remaining sibling events in the first state of the DOM. If there are no remaining sibling events in the first state of the DOM, the example process 500 ends (e.g., the event executor 220 traverses the DOM to a new branch of an event tree of the DOM). If there are remaining sibling events in the first state of the DOM (block 530), then the transaction manager 230 reverts the DOM from the second state of the DOM to the first state of the DOM at block 540. At block 550, the event executor 220 executes the sibling event. At block 550, the state change recorder 240 stores a second state change in the DOM in the log in response to executing the sibling event. After block 560, the example process 500 ends.

The example process 600 of FIG. 6 begins with an initiation of the DOM transaction crawler 110. The example process 600 may be iteratively executed to perform iterations of traversing an event in accordance with examples herein. At block 610, the event executor 220 executes a next event of a state of a DOM. At block 620, the state change recorder 240 records a state change (e.g., based on a state change identified by the transaction manager 230 after the event executor 220 executed the event). At block 630, the event identifier 210 and/or the event executor 220 determines whether there are any remaining sibling events in the state of the DOM. If at block 630, there are no remaining sibling events of the state of the DOM, control returns to block 610 for a subsequent iteration. If there are remaining sibling events in the DOM, at block 640, the event identifier 210 and/or event executor 220 determines whether there are any remaining events in the DOM. If there are no remaining events in the DOM at block 640, the example process 600 ends. If, at block 640, there are remaining events in the DOM, then at block 650, the transaction manager 230 retrieves state change data from a transaction log for a next state of the DOM and reverts the DOM to a state corresponding to the next event of the DOM. After block 650, control returns to block 610 for a subsequent iteration.

As mentioned above, the example processes of FIGS. 4, 5, and/or 6 may be implemented using coded instructions (e.g., computer and/or machine readable instructions) stored on a tangible machine readable storage medium such as a hard disk drive, a flash memory, a read-only memory (ROM), a compact disk (CD), a digital versatile disk (DVD), a cache, a random-access memory (RAM) and/or any other storage device or storage disk in which information is stored for any duration (e.g., for extended time periods, permanently, for brief instances, for temporarily buffering, and/or for caching of the information). As used herein, the term tangible machine readable storage medium is expressly defined to include any type of machine readable storage device and/or storage disk and to exclude propagating signals and to exclude transmission media. As used herein, "computer readable storage medium" and "machine readable storage medium" are used interchangeably. Additionally or alternatively, the example processes of FIGS. 4, 5, and/or 6 may be implemented using coded instructions (e.g., computer and/or machine readable instructions) stored on a non-transitory computer and/or machine readable medium such as a hard disk drive, a flash memory, a read-only memory, a compact disk, a digital versatile disk, a cache, a random-access memory and/or any other storage device or storage disk in which information is stored for any duration (e.g., for extended time periods, permanently, for brief instances, for temporarily buffering, and/or for caching of the information). As used herein, the term non-transitory machine readable medium is expressly defined to include any type of machine readable storage device and/or storage disk and to exclude propagating signals and to exclude transmission media.

As used herein, when the phrase "at least" is used as the transition term in a preamble of a claim, it is open-ended in the same manner as the term "comprising" is open ended. As used herein the term "a" or "an" may mean "at least one," and therefore, "a" or "an" do not necessarily limit a particular element to a single element when used to describe the element. As used herein, when the term "or" is used in a series, it is not, unless otherwise indicated, considered an "exclusive or."

Figure 7:
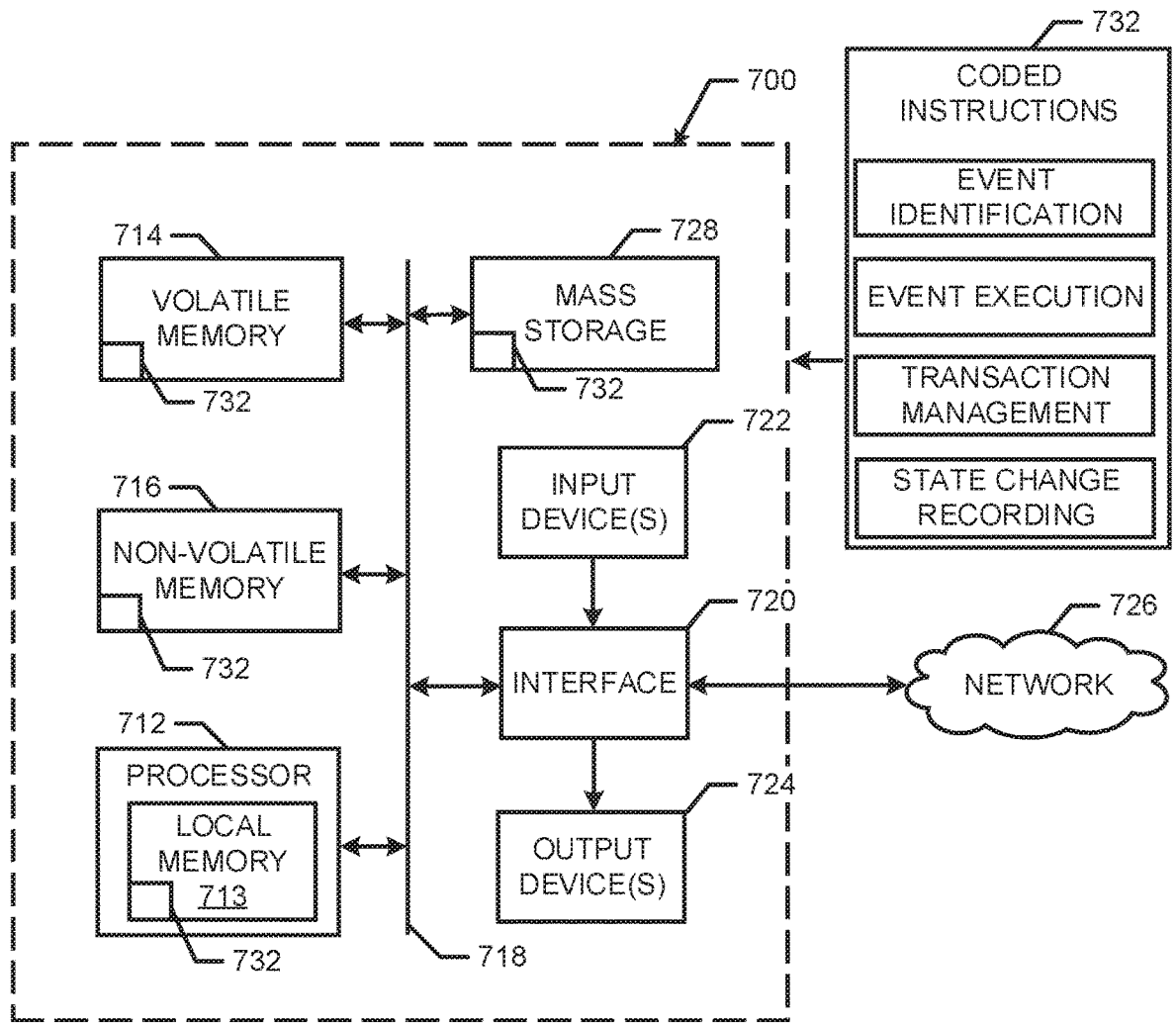
FIG. 7 is a block diagram of an example processor platform capable of executing the instructions of FIGS. 4, 5, and/or 6 to implement the DOM transaction crawler of FIG. 2.

FIG. 7 is a block diagram of an example processor platform 700 capable of executing the instructions of FIGS. 4, 5, and/or 6 to implement the DOM transaction manager 110 of FIG. 2. The example processor platform 700 may be or may be included in any type of apparatus, such as a server, a personal computer, a mobile device or any other type of computing device.

The processor platform 700 of the illustrated example of FIG. 7 includes a processor 712. The processor 712 of the illustrated example is hardware. For example, the processor 712 can be implemented by at least one integrated circuit, logic circuit, microprocessor or controller from any desired family or manufacturer.

The processor 712 of the illustrated example includes a local memory 713 (e.g., a cache). The processor 712 of the illustrated example is in communication with a main memory including a volatile memory 714 and a non-volatile memory 716 via a bus 718. The volatile memory 714 may be implemented by Synchronous Dynamic Random Access Memory (SDRAM), Dynamic Random Access Memory (DRAM), RAMBUS Dynamic Random Access Memory (RDRAM) and/or any other type of random access memory device. The non-volatile memory 716 may be implemented by flash memory, a persistent, byte-addressable memory accessible via a memory fabric and/or any other desired type of non-volatile memory device. Access to the main memory 714, 716 is controlled by a memory controller.

The processor platform 700 of the illustrated example also includes an interface circuit 720. The interface circuit 720 may be implemented by any type of interface standard, such as an Ethernet interface, a universal serial bus (USB), and/or a peripheral component interconnect (PCI) express interface.

In the illustrated example, at least one input device 722 is connected to the interface circuit 720. The input device(s) 722 permit(s) a user to enter data and commands into the processor 712. The input device(s) can be implemented by, for example, an audio sensor, a microphone, a camera (still or video), a keyboard, a button, a mouse, a touchscreen, a track-pad, a trackball, and/or a voice recognition system.

At least one output device 724 is also connected to the interface circuit 720 of the illustrated example. The output device(s) 724 can be implemented, for example, by display devices (e.g., a light emitting diode (LED), an organic light emitting diode (OLED), a liquid crystal display, a cathode ray tube display (CRT), a touchscreen, a tactile output device, a light emitting diode (LED), a printer and/or speakers). The interface circuit 720 of the illustrated example, thus, may include a graphics driver card, a graphics driver chip or a graphics driver processor.

The interface circuit 720 of the illustrated example also includes a communication device such as a transmitter, a receiver, a transceiver, a modem and/or network interface card to facilitate exchange of data with external machines (e.g., computing devices of any kind) via a network 726 (e.g., an Ethernet connection, a digital subscriber line (DSL), a telephone line, coaxial cable, a cellular telephone system, etc.).

The processor platform 700 of the illustrated example also includes at least one mass storage device 728 for storing executable instructions (e.g., software) and/or data. Examples of such mass storage device(s) 728 include floppy disk drives, hard drive disks, compact disk drives, Blu-ray disk drives, RAID systems, and digital versatile disk (DVD) drives.

The coded instructions 732 implementing the processes of FIGS. 4, 5, and/or 6 may be stored in the mass storage device 728, in the local memory 713 in the volatile memory 714, in the non-volatile memory 716, and/or on a removable tangible machine readable storage medium such as a CD or DVD.

From the foregoing, it will be appreciated that the above disclosed methods, apparatus and articles of manufacture provide a DOM transaction crawler that enables efficient and effective crawling of a web page or web application by traversing events of the web page or application using recorded transactions. In examples herein, a web crawler may navigate between events of a DOM without loading and executing an entire web application for each transition between states of the DOM. Accordingly, a transaction mechanism is disclosed herein that records atomic state changes that are replayed or rolled back to facilitate DOM transition navigation without application re-execution. Furthermore, examples herein allow for isolation of event executions that facilitates traversing an applications event space without accumulating state transitions. Tractability may be furthered using examples herein by persisting transactions to disk to relieve memory pressure on a web crawler.

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

What is claimed is:

1. A method performed by a system comprising a hardware processor, comprising:
    identifying a first event in a first state of a document object model (DOM) of an application;
    executing the first event to cause a first state change from the first state of the DOM to a second state of the DOM;
    recording the first state change in a transaction log, the first state change comprising a difference between the first state of the DOM and the second state of the DOM, wherein the transaction log further contains a plurality of state changes of the DOM, the plurality of state changes comprising a second state change recorded in the transaction log responsive to a second event that caused the second state change of the DOM; and reverting the DOM from the second state of the DOM to the first state of the DOM; and after reverting the DOM from the second state to the first state,
retrieving the plurality of state changes from the transaction log,
implementing the plurality of state changes retrieved from the transaction log to traverse the DOM from the first state to a third state of the DOM without re-executing the first event and the second event, and
execute a third event to cause a further state change of the DOM from the third state to another state of the DOM.

2. The method of claim 1, further comprising creating the DOM from a hypertext markup language of a universal resource locator.

3. The method of claim 1, further comprising:
determining that a fourth event is a sibling event of the first event in the first state of the DOM; and
executing the sibling event to cause a state change from the first state of the DOM to a different state of the DOM.

4. The method of claim 1, further comprising:
recording the further state change in the transaction log.

5. The method of claim 1, wherein the second state change of the DOM is from the first state to a fourth state of the DOM.

6. The method of claim 5, wherein the plurality of state changes further comprise a third state change of the DOM from the fourth state to the third state of the DOM, and wherein the implementing of the plurality of state changes comprises implementing the third state change in the DOM without executing a fourth event that caused a recording of the third state change in the transaction log.

7. The method of claim 1, further comprising:
determining that no sibling events of the first event remain in the first state of the DOM, wherein the retrieving, the implementing, and the executing of the third event are in response to the determining that no sibling events of the first event remain in the first state of the DOM.

8. A non-transitory machine readable medium comprising instructions that, when executed, cause a machine to:
identify a first state change in a document object model (DOM) of an application in response to executing a first event of a first state of the DOM, the first state change comprising a difference between the first state of the DOM and a second state of the DOM;
store the first state change in a transaction log, wherein the transaction log further contains a plurality of state changes of the DOM, the plurality of state changes comprising a second state change recorded in the transaction log responsive to a second event that caused the second state change of the DOM;
after the first state change from the first state of the DOM to the second state of the DOM, revert the DOM from the second state of the DOM to the first state of the DOM; and
after reverting the DOM from the second state to the first state,
retrieve the plurality of state changes from the transaction log,
implement the plurality of state changes retrieved from the transaction log to traverse the DOM from the first state to a third state of the DOM without re-executing the first event and the second event, and
execute a third event to cause a further state change of the DOM from the third state to another state of the DOM.

9. The non-transitory machine readable medium of claim 8, wherein the instructions, when executed, cause the machine to:
determine if any remaining sibling event of the first event exists in the first state of the DOM;
if no remaining sibling event of the first event exists in the first state of the DOM, perform the retrieving, the implementing, and the executing of the third event.

10. The non-transitory machine readable medium of claim 9, wherein the instructions, when executed, cause the machine to:
if a remaining sibling event of the first event exists in the first state of the DOM, execute the remaining sibling event.

11. The non-transitory machine readable medium of claim 8, wherein the instructions, when executed, cause the machine to:
generate the DOM from a hypertext markup language of the application.

12. The non-transitory machine readable medium of claim 8, wherein the second state change is from the first state to a fourth state of the DOM.

13. The non-transitory machine readable medium of claim 9, wherein the instructions, when executed, cause the machine to determine if any remaining sibling event of the first event exists based on a breadth-first crawl of the DOM.

14. The non-transitory machine readable medium of claim 12, wherein the plurality of state changes further comprise a third state change of the DOM from the fourth state to the third state of the DOM, and wherein implementing the plurality of state changes comprises implementing the third state change in the DOM without executing a fourth event that caused a recording of the third state change in the transaction log.

15. An apparatus comprising:
a processor; and
a non-transitory storage medium storing instructions executable on the processor to:
identify a first event in a first state of a document object model (DOM) of an application;
execute the first event to cause a first state change from the first state of the DOM to a second state of the DOM;
record the first state change in a transaction log, wherein the transaction log further contains a plurality of state changes of the DOM, the plurality of state changes comprising a second state change recorded in the transaction log responsive to a second event that caused the second state change of the DOM:
revert the DOM from the second state of the DOM to the first state of the DOM; and
after reverting the DOM from the second state to the first state,
retrieve the plurality of state changes from the transaction log,
implement the plurality of state changes retrieved from the transaction log to traverse the DOM from the first state to a third state of the DOM without re-executing the first event and the second event, and execute a third event to cause a further state change of the DOM from the third state to another state of the DOM.

16. The apparatus of claim 15, wherein the instructions are executable on the processor to use a breadth-first crawl to identify events of the DOM to execute.

17. The apparatus of claim 15, wherein the instructions are executable on the processor to use a depth-first crawl to identify events of the DOM to execute.

18. The apparatus of claim 15, wherein the instructions are executable on the processor to create the DOM from a hypertext markup language of the application.

19. The apparatus of claim 15, wherein the second state change is from the first state to a fourth state of the DOM.

20. The apparatus of claim 19, wherein the plurality of state changes further comprise a third state change of the DOM from the fourth state to the third state of the DOM, and wherein implementing the plurality of state changes comprises implementing the third state change in the DOM without executing a fourth event that caused a recording of the third state change in the transaction log.

* * * * *